(12) United States Patent
Kinyon et al.

(10) Patent No.: US 12,339,258 B2
(45) Date of Patent: Jun. 24, 2025

(54) PRECISION HIGH-TEMPERATURE HYDROGEN ATTACK APPARATUS

(71) Applicant: Stress Engineering Services, Inc., Houston, TX (US)

(72) Inventors: Steven Kinyon, Magnolia, TX (US); Dustin McKnight, Waller, TX (US); David Murphey, Houston, TX (US)

(73) Assignee: Stress Engineering Services, Inc., Houston, TX (US)

(*) Notice: Subject to any disclaimer, the term of this patent is extended or adjusted under 35 U.S.C. 154(b) by 761 days.

(21) Appl. No.: 17/561,311

(22) Filed: Dec. 23, 2021

(65) Prior Publication Data
US 2022/0196530 A1 Jun. 23, 2022

Related U.S. Application Data

(60) Provisional application No. 63/130,263, filed on Dec. 23, 2020.

(51) Int. Cl.
| | | |
|---|---|---|
| *G01N 3/56* | (2006.01) | |
| *G01N 1/44* | (2006.01) | |
| *G01N 3/04* | (2006.01) | |
| *G01N 3/20* | (2006.01) | |
| *G01N 17/00* | (2006.01) | |

(52) U.S. Cl.
CPC ............ *G01N 3/56* (2013.01); *G01N 1/44* (2013.01); *G01N 3/04* (2013.01); *G01N 3/20* (2013.01); *G01N 17/006* (2013.01)

(58) Field of Classification Search
CPC .. G01N 3/56; G01N 1/44; G01N 3/04; G01N 3/20; G01N 17/006; G01N 1/04; G01N 3/32; G01N 3/24; G01N 3/60; G01N 17/04; G01N 23/202; B01J 3/04; G01M 15/14; E21B 33/062; E21B 49/10
See application file for complete search history.

(56) References Cited

U.S. PATENT DOCUMENTS 4,155,567 A * 5/1979 Nordmark ................. B60P 7/12
280/145

OTHER PUBLICATIONS

Swindeman, Michael, et al., High Temperature Hydrogen Attack (HTHA) Models for the Petrochemical Industry, Proceedings of the ASME 2021 Pressure Vessels & Piping Conference PVP 2021, Jul. 12-16, 021, Virtual, Online, 12 pages.

* cited by examiner

*Primary Examiner* — Brandi N Hopkins
(74) *Attorney, Agent, or Firm* — Saunders McKeon PLLC; Christopher McKeon

(57) ABSTRACT

A method and apparatus for measuring corrosion damage in a sample while under a bending load at a desired temperature and pressure to simulate production environments and accelerate hydrogen attack on the sample undergoing hoop stress, axial stress, and/or tensile stress, while controlling the exposure rate to hydrogen and increasing the safety of using pressurized hydrogen.

20 Claims, 3 Drawing Sheets

PRECISION HIGH-TEMPERATURE HYDROGEN ATTACK APPARATUS

RELATED APPLICATIONS

This application claims priority to U.S. Provisional Application No. 63/130,263, filed Dec. 23, 2020.

BACKGROUND OF THE INVENTION

Concern with high-temperature hydrogen attack (HTHA) in carbon and low alloy steels and weldments has prompted the development of mathematical models to predict the onset of HTHA, cracklike growth and ultimate failure of the material under environmental attack related to hydrogen and loading conditions. This predictive modeling requires physical understanding of the effects of the parameters that can produce this type of hydrogen attack (rather than regular corrosion). Precise application of bending stresses, temperature, and internal pressure, function of metallurgy and weld as applicable are required to accurately measure the damage produced at any given condition. Prior engineering practice corrosion tests employ a tensile sample immersed in a hydrogen rich environment with minimally accurate control of pressure, temperature, and applied stresses.

Bubble nucleation is perhaps the least understood step of the HTHA process. The methane pressure needed to overcome the intrinsic surface tension is inversely proportional to the bubble radius and since methane pressure decreases with increasing temperature, it is found that bubbles would nucleate very rapidly at low temperatures and very slowly at high temperature. Other factors such as initial imperfections may become very important at higher temperatures, while still other mechanisms are needed to slow down bubble nucleation at lower temperatures to match observed experiments. Factors such as prior cold work likely play an important role in the nucleation process. After nucleation, the rate of bubble growth is controlled by factors which are more clearly identifiable. These include: diffusion of the reactants, carbon and hydrogen, to reaction site, rate of reaction, bubble growth by vacancy diffusion (either along grain boundaries or along bubble surface), and accommodation of grain boundary growth by creep.

The hydrogen transport aspects are not rate limiting except inasmuch as they determine the hydrogen concentration since the hydrogen equilibrium gradient is established quickly at the conditions that result in HTHA. Metastable carbides, like cementite, provide a readily available source of carbon, therefore, carbon transport would only become a rate-limiting aspect towards the later stages of HTHA after significant decarburization has taken place and after all the readily available sources of carbon near preferred sites have been exhausted. Except under the most severe conditions, the rate of reaction can also be neglected as the rate limiting mechanism as pressures can develop small bubbles on the order of seconds to hours. Thus, after the nucleation phase, the rate of HTHA appears to be controlled primarily by vacancy diffusion mechanisms with any external stress field possibly assisting bubble growth accommodation by creep.

SUMMARY OF EXAMPLE EMBODIMENTS

An example embodiment may include a testing apparatus comprising a loading frame with legs connected to a first load cylinder mount and a second load cylinder mount, at least one beam coupled to the first load cylinder mount and coupled to the second load cylinder mount, a first load cylinder coupled underneath the first load cylinder mount and having a first piston rod protruding through the top of the first load cylinder mount, a second load cylinder coupled underneath the second load cylinder mount and having a second piston rod protruding through the top of the second load cylinder mount, a first bending reaction beam and a second bending reaction beam parallel to each other and coupled perpendicular to the top of the at least one beam, a cylindrical sample assembly having a center sample portion, a first extension portion, and a second extension portion, wherein the first piston rod is coupled to the first extension portion, the second piston rod is coupled to the second extension portion, and the sample portion is disposed perpendicularly across the parallel first bending reaction beam and second bending reaction beam.

A variation of the example embodiment may include the sample portion containing a hollow cylindrical cavity. The first extension portion may contain a connection port at the distal end and a thru hole. The second extension portion may contain a connection port at the distal end and a thru hole. The first load cylinder and second load cylinder may apply a bending load to the sample portion. A corrosive fluid may be circulated at a desired temperature and pressure into the hollow cylindrical cavity. At least one strain sensor may be affixed to the cylindrical sample assembly. At least one temperature sensor may be affixed to the cylindrical sample assembly. At least one strain sensor may collect data and provide feedback for controlling a desired stress in the center sample portion. At least one temperature sensor may collect data and provide feedback for controlling a desired temperature for the center sample portion. The corrosive fluid may be hydrogen gas.

An example embodiment may include a testing apparatus comprising a plurality of loading frames, each with legs connected to a first load cylinder mount and a second load cylinder mount, at least one beam coupled to the first load cylinder mount and coupled to the second load cylinder mount, each loading frame having a first load cylinder coupled underneath the first load cylinder mount and having a first piston rod protruding through the top of the first load cylinder mount, each loading frame having a second load cylinder coupled underneath the second load cylinder mount and having a second piston rod protruding through the top of the second load cylinder mount, each loading frame having a first bending reaction beam and a second bending reaction beam parallel to each other and coupled perpendicular to the top of the at least one beam, each loading frame having a cylindrical sample assembly having a center sample portion, a first extension portion, and a second extension portion, wherein the first piston rod is coupled to the first extension portion, the second piston rod is coupled to the second extension portion, and the sample portion is disposed perpendicularly across the parallel first bending reaction beam and second bending reaction beam.

A variation of the example embodiment may include each sample portion may contain a hollow cylindrical cavity. Each first extension portion may contain a connection port at the distal end and a thru hole. Each second extension portion may contain a connection port at the distal end and a thru hole. Each first load cylinder and each second load cylinder may apply a bending load to each sample portion. A corrosive fluid may be circulated at a desired temperature and pressure into each hollow cylindrical cavity. At least one strain sensor may be affixed to each cylindrical sample assembly. At least one temperature sensor may be affixed to each cylindrical sample assembly. At least one strain sensor may collect data and provide feedback for controlling a desired stress in each center sample portion. At least one temperature sensor may collect data and provide feedback for controlling a desired temperature for each center sample portion. The corrosive fluid may be hydrogen gas.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

Figure 1:
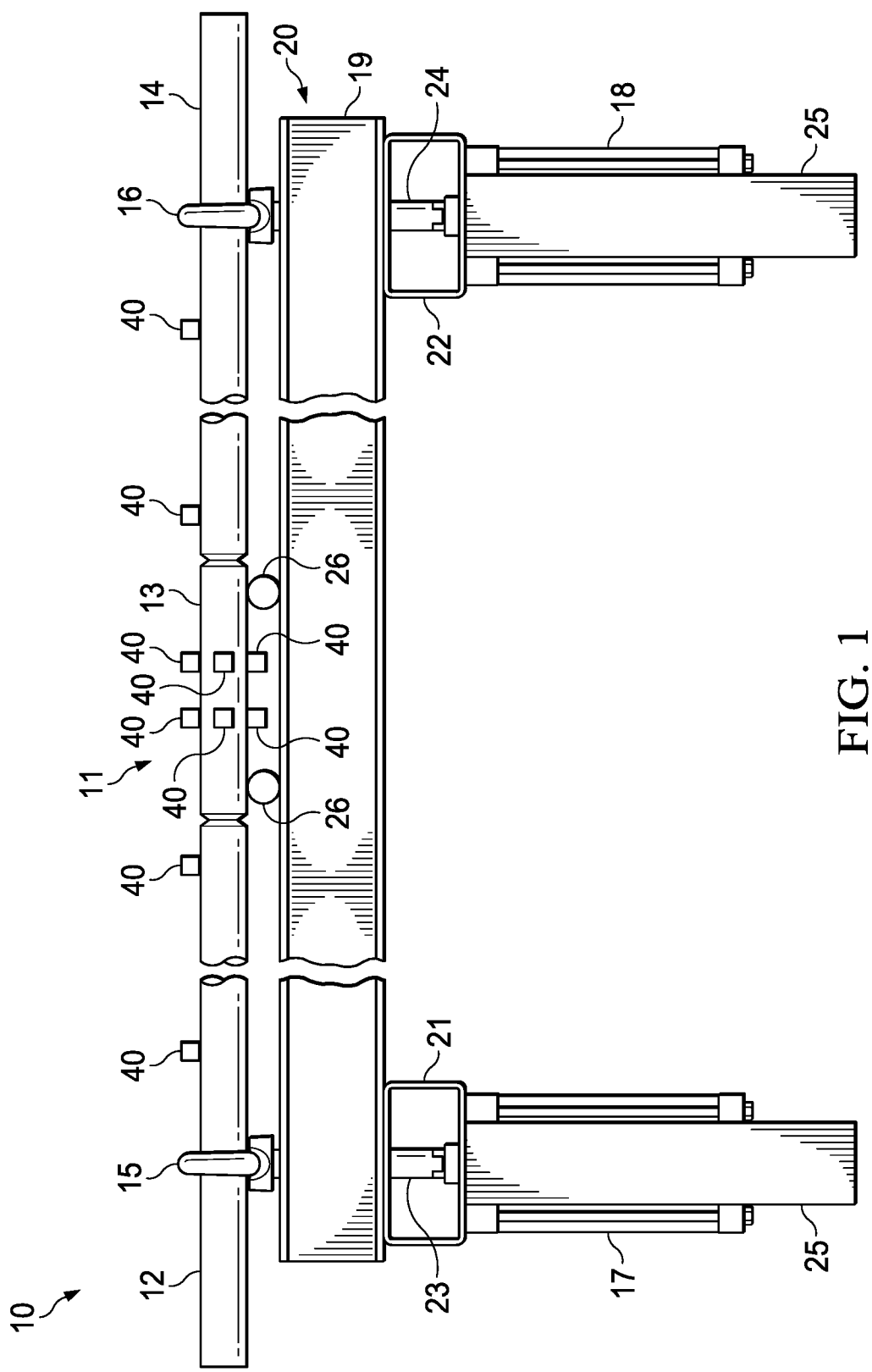
FIG. 1 shows an example embodiment of a corrosion test setup.

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

HTHA occurs when hydrogen from the process stream, enters the steel and interacts with carbon to form methane. Because methane cannot easily diffuse through the metal it accumulates forming microscopic bubbles (often identified as voids), especially along grain boundaries. The growth and coalescence of these bubbles, driven by the methane pressure, leads to the loss of mechanical properties, especially ductility.

In the predicted methane equilibrium, pressures along the Nelson curves for carbon steel, with or without post weld heat treatment, the predicted methane pressure increases with increasing hydrogen pressure but decreases with increasing temperature.

An example embodiment of a modeling expression given for the grain boundary thickening:

$$\frac{1}{t_0(T, P_{CH_4})} = \frac{B}{T}(P_{CH_4})^n \exp\left(\frac{-Q_m}{RT}\right)$$

Where to is the time to some damage state (incubation time, cracking, or failure for example) which is reflected in the local grain boundary thickening strain. The simplifications are: surface tension can be neglected over most of the life since the methane pressure dominates (this assumption may not hold for Cr containing steels operating at higher temperatures, the activation energy, $Q_m$, reflects the dominant diffusion mechanism (surface, grain boundary, etc. . . . ), equilibrium methane pressure is quickly established at the damaging conditions.

Rearranging the terms to parametric form:

$$\ln(T) - \ln(t_0) + \left(\frac{Q_m}{RT}\right) = \ln(B) + n\ln(P_{CH_4})$$

The left-hand side is the time-temperature-parameter ($Y_{TTP}$). Defining the methane parameter ($X_M$) as the natural log of the methane pressure, the expression reflects a linear relationship between the methane parameter and the time-temperature parameter.

An example embodiment may use a unique short sample tubular gage section of approximately 16 inches. This reduced gage section resulted in low gas volumes under pressure that greatly reduced the risk to personnel and facility safety. The shortened test chamber section created features for the test conditions that had to be rectified in the test program. The applied bending forces increase substantially when applying bending to a short test piece. The shortened test piece is also greatly susceptible to higher variations in applied bending stresses when the length of the bending span approaches the diameter of the tubular sample. Test sample extension endcaps were specifically designed to increase the test sample length for bending while not increasing the volume of encased hydrogen gas. This required transmission of bending as well as a leak-proof seal that would not fail. The design of the endcaps incorporated a bending interference fit internal shoulder, a welded connection for sealing, and feedthroughs to the end of the solid extension for application of internal gas.

The example embodiments of the testing method disclosed is novel because this test system and apparatus induces damage from one side exposed to the hydrogen environment rather than complete immersion in hydrogen or hydrogen rich fluids. Inherent to developing the damage required within this test program was maintaining a high purity (near 100%) hydrogen environment with enough pressure at high temperature. The presence of pressurized hydrogen at high temperature under normal conditions is known to prompt detonation when hydrogen damage accumulated in the test sample to cause catastrophic failure. This detonation is energetic enough to cause significant damage to the test sample as well as the testing facility. Limiting the volume of the sample was critical to successfully create repeatable damage that could be metallurgically examined without further damaging by the detonation of the test media after failure.

The example embodiments relates to a phenomenon created in high-temperature service conditions where the presence of hydrogen in conjunction with a susceptible microstructure, internal pressures static, and possible residual stresses in the material can produce metallurgical damage (cracking) to alloy steels used to transmit the fluids involved.

An example embodiment may include an apparatus for precisely creating laboratory quality, one-sided, hydrogen attack at various elevated temperatures, using a four-point bend method on welded or virgin tubular samples. High static internal pressure applied to the sample is used to simulate production environments and modeling conditions that encourage the attack. The test apparatus accurately applies four-point bending to the unique test sample through oppositely situated simple supports and air activated actuators. The internal pressure provides hoop stress and partial axial stress and additional tensile stress is applied to the test sample using high-purity hydrogen (99.99% H2) controlled to within 0.03% of desired pressure. The accelerated attack environment is simulated in-situ at temperatures as high as 1,000° F., hydrogen pressures as high as 2,000 psi, and bending stresses near 100% material yield near the internal wall of the sample. The applied stresses vary around the circumference as well as changes from inner diameter to outer diameter and dissipation as a function of distance from maximum the bending condition.

HTHA Test Conditions: Develop a test protocol to safely perform statically stressed conditions on three tubular test samples at High temperature (150-850° F.)±2° F. All three tests can be at different pressures. Constant pressure ±–5 psi, 100% H2 (500-3,000 psi). All three tests can be at different temperatures. Constant bending stresses are applied to each test sample in four-point bend. All three tests can have different bending stresses. Automatic Backup for temperature/pressure/bending in the case of power outages.

An example embodiment disclosed in FIG. 1 includes a test setup 10 having a frame 20. The frame 20 includes support legs 25 connected to cylinder mounts 21 and 22, and including one or more reaction beams 19. Load cylinders 17 and 18 are connected to the cylinder mounts 22 and 21 respectively and each as a piston rod 23 and 24 protruding upwards through the cylinder mounts 21 and 22. The piston rod 23 and 24 are coupled to clamps 15 and 16, respectively. A test sample assembly 11 lays on top of the bending reaction beams 26, which are welded perpendicular to the reactions beams 19 of frame 20. The sample assembly 11 includes the sample 13, a first extension portion 12, and a second extension portion 14. The sample 13 may have one or more sensors mounted to its exterior to measure strain or temperature at locations of interest. The first extension portion 12 or the second extension portion 14 may have one or more sensors mounted to their respective exteriors to measure strain or temperature at locations of interest.

The sample 13 may be temperature controlled, such as wrapping it in a cooling coil, a heating coil, or insulation. The entire test setup 10 could also be placed in a temperature-controlled environment. A corrosive fluid, such as a gas or liquid solution can be circulated into the interior of the sample 13 through connection ports on the first extension portion 12 or the second extension portion 14. The corrosive solution may be held steady within the sample 13 at a desired pressure or it may be circulated to maintain a desired temperature or concentration, while maintaining a desired pressure.

Sensors 40 may be attached at multiple locations on the sample assembly 11, including on the sample 13, the first extension portion 12, and the second extension portion 14. Sensors 40 may include strain gauges for detecting stress and temperature sensors. Sensors 40 may be arranged about the center axis in a pattern to detect bending, tension, and compression stresses in the sample 13. Sensors 40 may also be used in a feedback loop to adjust the stress or the temperature applied to the sample 13. The data from sensors 40 may be collected and analyzed by one or more computers in real-time or the data may be stored for post testing analysis using finite element analysis software. Furthermore, a plurality of test setups may be used simultaneously with different temperature, time, or stress parameters and then the measured data from the plurality of sensors 40 from the plurality of test setups 10 can be analyzed and compared to determine the corrosion characteristics of a plurality of samples 13. Furthermore, pressure sensors may be affixed within the sample assembly 11 to collect data and regulate the pressure applied inside the sample 13.

Figure 2:
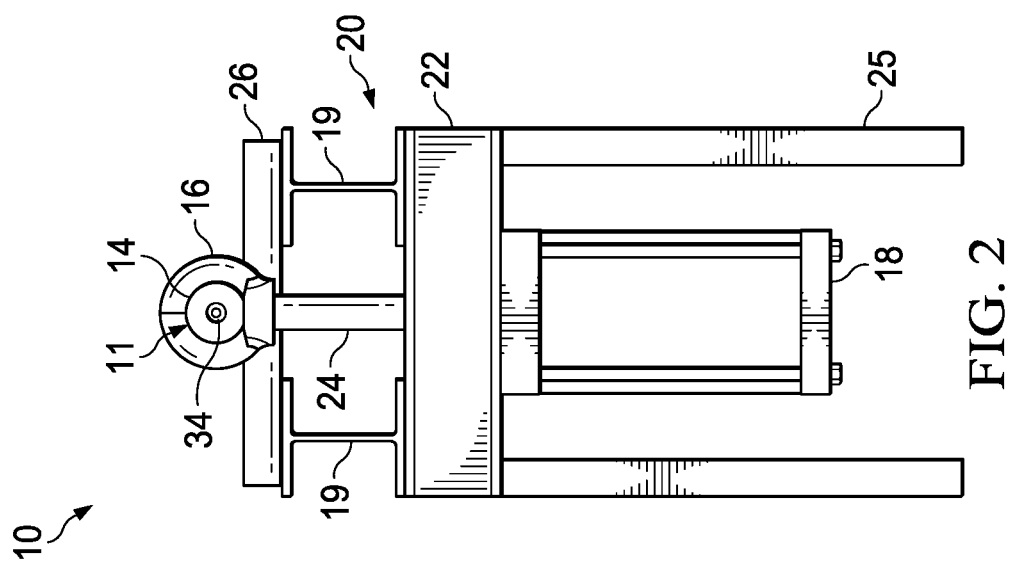
FIG. 2 shows an example embodiment of a corrosion test setup.

A side view of the example embodiment disclosed in FIG. 2 shows the load cylinder 18 with the piston rod 24 extending through the cylinder mount 22 and positioned in between the reactions beams 19. The sample assembly 11 includes the second extension 14 having a connection port 34 for introducing a corrosive liquid or gas, such as hydrogen gas.

Figure 3:
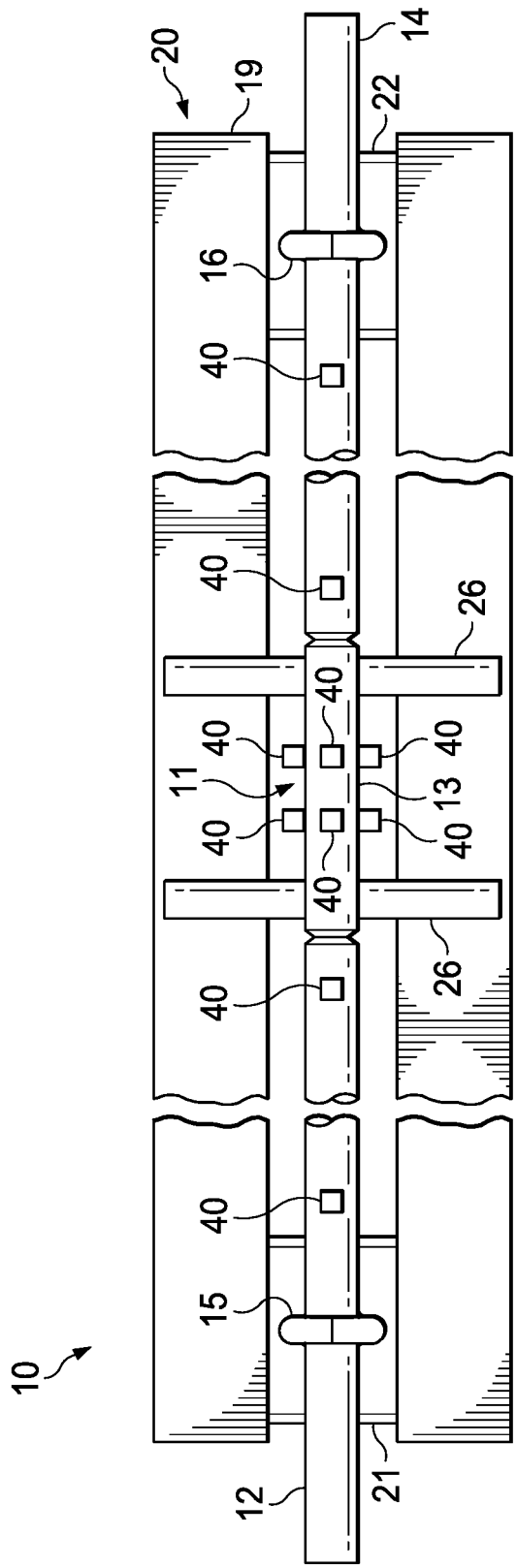
FIG. 3 shows an example embodiment of a corrosion test setup.

A side view of the example embodiment disclosed in FIG. 3 shows the sample assembly 11 mounted across the perpendicular bending reaction beams 26 and coupled to the camps 15 and 16, thus providing for putting the sample assembly into 4 point bending as desired by adjusting the load applied by load cylinders 17 and 18. The four point bending results in axial stress within the sample 13 as it undergoes corrosive attack. A gas delivery method can maintain a pure hydrogen environment within the tubular test sample 13 of 2,000±10 psi. Temperature of the sample 13 can be controlled to less than 1% variation, such as within 5° F. of 800° F. Static axial forces are applied to the sample by manipulating the load cylinders 17 and 18, which exert a bending force through the tubular extension portions 12 and 14, in addition to the bending reaction beams 26.

Figure 4:
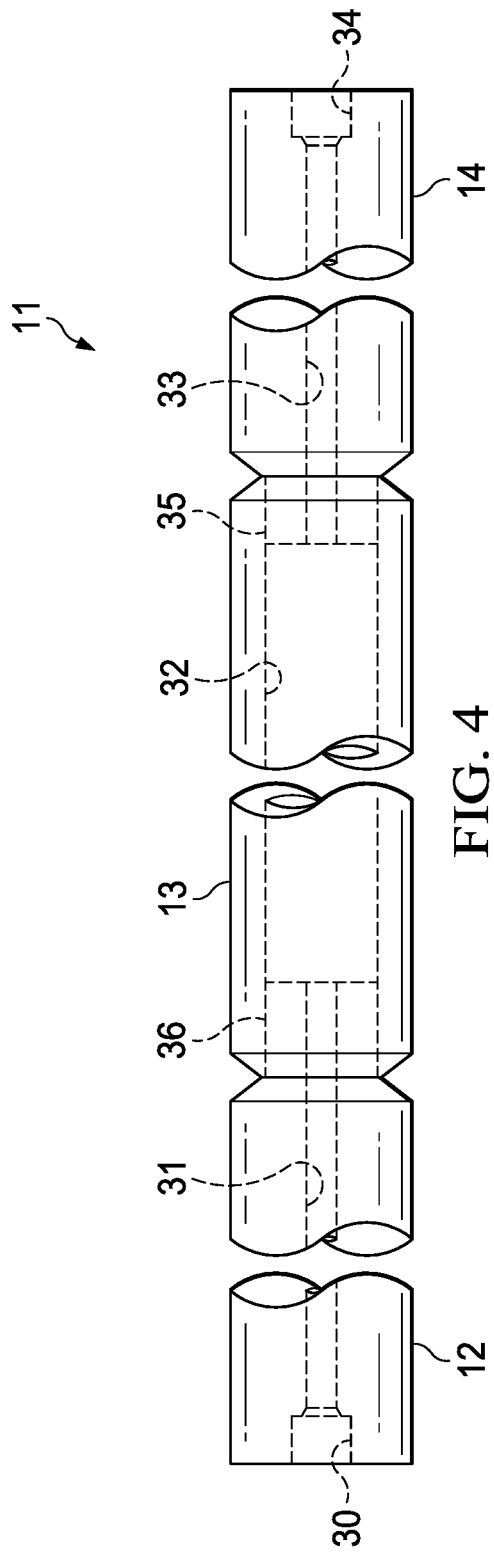
FIG. 4 shows an example embodiment of a corrosion sample assembly.

FIG. 4 shows an example embodiment of a corrosion sample assembly. The cross section of the sample assembly 11 shows the extension portion 12 has a connection port 30, a thru hole 31, and a pin end 36 adapted to engage within the inner hollow cavity 32 of the sample 13. The extension portion 14 has a connection port 34, a thru hole 33, and a pin end 35 adapted to engage within the inner hollow cavity 32 of the sample 13. A corrosive fluid, such as a hydrogen gas under pressure, can be circulated through one or both of the connection ports 30 and/or 34. The corrosive fluid can be maintained at pressure and temperature statically within the inner hollow cavity 32 of the sample 13 or it can be continuously circulated as desired. Both of the connection ports 30 and/or 34 can be sealed with an end cap. The corrosive fluid can be adjusted in terms of temperature, pressure, or concentration based on desired testing parameters. The sample portion 13 can be sealed against the extension portion 14 and extension portion 12 with 0-rings, welding, or other known methods of sealing to prevent hydrogen gas from leaking out of the sample assembly 11.

Although the invention has been described in terms of embodiments which are set forth in detail, it should be understood that this is by illustration only and that the invention is not necessarily limited thereto. Top and bottom could be left and right, respectively. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A testing apparatus comprising:
   a loading frame with legs connected to a first load cylinder mount and a second load cylinder mount;
   at least one beam coupled to the first load cylinder mount and coupled to the second load cylinder mount;
   a first load cylinder coupled underneath the first load cylinder mount and having a first piston rod protruding through the top of the first load cylinder mount;
   a second load cylinder coupled underneath the second load cylinder mount and having a second piston rod protruding through the top of the second load cylinder mount;
   a first bending reaction beam and a second bending reaction beam parallel to each other and coupled perpendicular to the top of the at least one beam;
   a sample assembly having a center sample portion, a first extension portion, and a second extension portion, wherein the first piston rod is coupled to the first extension portion, the second piston rod is coupled to the second extension portion, and the sample portion is disposed perpendicularly across the parallel first bending reaction beam and second bending reaction beam; and at least one temperature sensor affixed to the sample assembly.

2. The testing apparatus of claim 1, wherein the sample portion contains a hollow cylindrical cavity.

3. The testing apparatus of claim 2, wherein a corrosive fluid is circulated at a desired temperature and pressure into the hollow cylindrical cavity.

4. The testing apparatus of claim 3, wherein the corrosive fluid is hydrogen gas.

5. The testing apparatus of claim 1, wherein the first extension portion contains a connection port at the distal end and a thru hole.

6. The testing apparatus of claim 1, wherein the second extension portion contains a connection port at the distal end and a thru hole.

7. The testing apparatus of claim 1, wherein the first load cylinder and second load cylinder apply a bending load to the sample portion.

8. The testing apparatus of claim 1, further comprising at least one strain sensor affixed to the sample assembly.

9. The testing apparatus of claim 8, wherein the at least one strain sensor collects data and provides feedback for controlling a desired stress in the center sample portion.

10. The testing apparatus of claim 1, wherein the at least one temperature sensor collects data and provides feedback for controlling a desired temperature for the center sample portion.

11. A testing apparatus comprising:
a plurality of loading frames, each with legs connected to a first load cylinder mount and a second load cylinder mount, at least one beam coupled to the first load cylinder mount and coupled to the second load cylinder mount;

each loading frame having a first load cylinder coupled underneath the first load cylinder mount and having a first piston rod protruding through the top of the first load cylinder mount;

each loading frame having a second load cylinder coupled underneath the second load cylinder mount and having a second piston rod protruding through the top of the second load cylinder mount;

each loading frame having a first bending reaction beam and a second bending reaction beam parallel to each other and coupled perpendicular to the top of the at least one beam;

each loading frame having a sample assembly having a center sample portion, a first extension portion, and a second extension portion, wherein the first piston rod is coupled to the first extension portion, the second piston rod is coupled to the second extension portion, and the sample portion is disposed perpendicularly across the parallel first bending reaction beam and second bending reaction beam; and at least one temperature sensor affixed to each sample assembly.

12. The testing apparatus of claim 11, wherein each sample portion contains a hollow cylindrical cavity.

13. The testing apparatus of claim 12, wherein a corrosive fluid is circulated at a desired temperature and pressure into each hollow cylindrical cavity.

14. The testing apparatus of claim 13, wherein the corrosive fluid is hydrogen gas.

15. The testing apparatus of claim 11, wherein each first extension portion contains a connection port at the distal end and a thru hole.

16. The testing apparatus of claim 11, wherein each second extension portion contains a connection port at the distal end and a thru hole.

17. The testing apparatus of claim 11, wherein each first load cylinder and each second load cylinder apply a desired bending load to each sample portion.

18. The testing apparatus of claim 11, further comprising at least one strain sensor affixed to each sample assembly.

19. The testing apparatus of claim 18, wherein the at least one strain sensor collects data and provides feedback for controlling a desired stress in each center sample portion.

20. The testing apparatus of claim 11, wherein the at least one temperature sensor collects data and provides feedback for controlling a desired temperature for each center sample portion.

* * * * *